United States Patent [19]

Kadota et al.

[11] Patent Number: 4,846,238
[45] Date of Patent: Jul. 11, 1989

[54] HEAVY DUTY PNEUMATIC RADIAL TIRE WITH A CARCASS PLY COMPOSED OF AROMATIC POLYAMIDE FIBER CORDS

[75] Inventors: Kuninobu Kadota, Kodaira; Hidenori Masuda, Higashimurayama, both of Japan

[73] Assignee: Bridgestone Corporation, Tokyo, Japan

[21] Appl. No.: 127,320

[22] Filed: Dec. 2, 1987

[51] Int. Cl.$^4$ .............................................. B60C 15/06
[52] U.S. Cl. ..................................... 152/554; 152/543; 152/546
[58] Field of Search ............... 152/543, 542, 546, 552, 152/554, 560, 548, 556

[56] References Cited

U.S. PATENT DOCUMENTS

| | | | |
|---|---|---|---|
| 4,046,183 | 9/1977 | Takahashi et al. | 152/543 X |
| 4,185,677 | 1/9180 | Motomura et al. | 152/362 |
| 4,289,184 | 9/1981 | Motomura et al. | 152/543 X |
| 4,688,616 | 8/1987 | Iuchi | 152/543 X |

FOREIGN PATENT DOCUMENTS

| | | |
|---|---|---|
| 58-89405 | 5/5983 | Japan . |
| 2127361 | 11/1984 | United Kingdom . |

*Primary Examiner*—Raymond Hoch
*Attorney, Agent, or Firm*—Sughrue, Mion, Zinn, Macpeak & Seas

[57] ABSTRACT

A heavy duty pneumatic radial tire is disclosed, which comprises a single carcass ply having aromatic polyamide fiber cords at a cord angle of about 90° relative to a tire equatorial plane, a pair of bead cores, and first and second reinforcing layers successively laminated axially outside turn-up portions of the carcass ply. A height of the turn-up portion is from 0.075 to 0.16 time that of the carcass ply in a tire section. The first reinforcing layer comprises steel cords arranged obliquely to the carcass ply cords, and has a radially outer end higher than an end of the turn-up portion. The following relation exists among $a_1$, $d_1$, $a_2$, $d_2$, $T_1$ and $T_2$:

$$\frac{d_1}{a_1} \tan\left(\frac{a_1}{d_1}\pi\right) \leq \frac{T_1}{T_2} \cdot \frac{d_2}{a_2} \tan\left(\frac{T_2}{T_1} \cdot \frac{a_2}{d_2}\pi\right)$$

in which $a_1$, $d_1$, $a_2$, $d_2$, $T_1$, and $T_2$ are a radius (mm) and an interval (mm) of the steel cords of the first reinforcing layer at the radially outer end, a radius (mm) and an interval (mm) of the cords of the carcass ply, a tenacity(kg) of a single cord of the first reinforcing layer, and a tenacity (kg) of a single cord of the carcass ply, respectively. The second reinforcing layer consists of at least two reinforcing layer units each having organic fiber cords intersecting between the layer units, and is continuously turned up from an axially outside of the first reinforcing layer to the inside of the carcass ply. The radially outer end of the second reinforcing layer is higher by 5 to 20 mm than of the first reinforcing layer. The radially outer ends of the second reinforcing layer units are vertically spaced from each other by 5 to 20 mm. The axially outermost second reinforcing layer unit is positioned highest. The cords of the axially inner second reinforcing layer unit intersect with those of the first reinforcing layer.

3 Claims, 2 Drawing Sheets

FIG_2
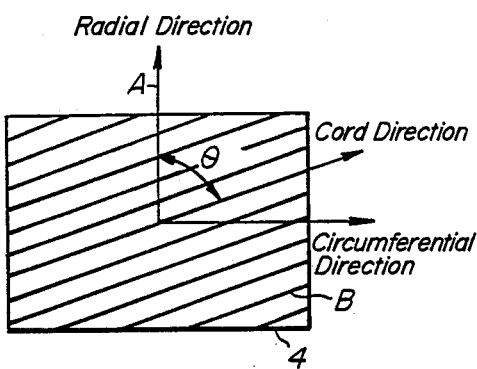
FIG_3
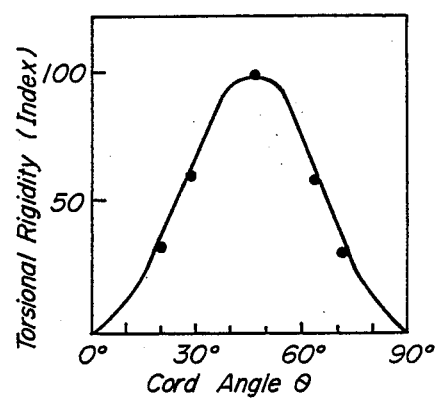
FIG_4
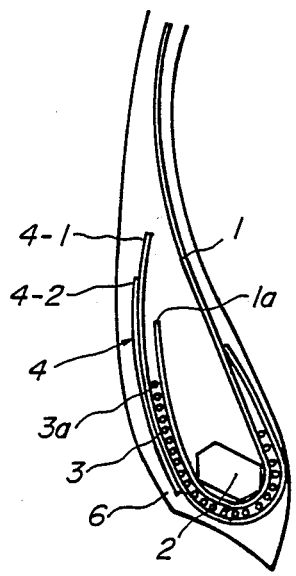
FIG_5
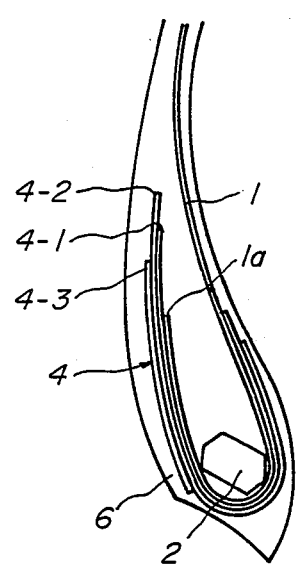

HEAVY DUTY PNEUMATIC RADIAL TIRE WITH A CARCASS PLY COMPOSED OF AROMATIC POLYAMIDE FIBER CORDS

BACKGROUND OF THE INVENTION (1) Field of the Invention

The present invention relates to heavy duty pneumatic tires. More particularly, the invention relates to a technique for improving durability of bead portions in heavy duty pneumatic radial tires using cords of aromatic polyamide fibers as carcass ply cords arranged substantially at right angles with respect to the tire circumferential direction.

(2) Related Art Statement

When cords of aromatic polyamide fibers are used in a carcass ply of a pneumatic radial tire, various merits can be obtained. That is, a weight of the tire can be reduced, as compared with a tire using steel cords, to thereby reduce fuel consumption of a vehicle. However, in order to maintain the same carcass strength as in the use of steel cords, it is necessary to increase a diameter of the fiber cords, or narrow an interval between the cords, or increase the diameter of the cords and at the same time narrow the cord interval. As a result, there exists a problem in that a stress concentrates near end portions of the cords so that cracks are likely to occur at the cord end portions.

Therefore, when aromatic polyamide fiber cords are used, bead durability which is evaluated based on a running distance by which a bead undergoes trouble in a drum test is reduced by about 30% than that in the use of steel cords in the same bead structure. Thus, a technique for improving the bead durability has been required.

As a countermeasure for solving a problem of a reduced bead durability which is caused by earlier cracking at ply cord end portions as seen when the aromatic polyamide fiber cords are used in a carcass ply, for instance, Japanese patent application Laid-open No. 58-89,405 proposed a technique by which a deflection-deforming at end portions of turn-up portions of a carcass ply during running is prevented by arranging the end portions of the turn-up portions of the carcass ply lower than a rim flange, and an effect is actually obtained. However, in pneumatic tires, such as heavy duty pneumatic tires of a 15° taper rim type, in which a rim flange is low, when end portions of turn-up portions of a carcass ply are located lower than the rim flange, the end portion of the turn-up portion of the carcass ply may be pulled out from a bead portion due to tire internal pressure, or a great separation occurs at the ply end at an earlier stage due to a stress concentration thereon. Consequently, there is a problem in that sufficient bead durability cannot be ensured.

SUMMARY OF THE INVENTION

The present invention has been accomplished through reviewing prior art techniques for solving the above problem of reduced bead durability in heavy duty pneumatic radial tires using polyamide fiber cords in a carcass ply due to cracking at end portions of turn-up portions of cords which cracking occurs by stress concentration at end portions of the carcass ply turn-up portions owing to increases in a diameter of the cords used and increase in an end count to obtain the same carcass strength as in the use of steel cords. The invention is aimed at making such an improvement that stress concentration upon the end portions of the turn-up portions of the carcass ply may be prevented and that the turn-up portions may be prevented from pulling out from the bead portions.

The requirements necessary for attaining the above object are as follows:

(1) When the aromatic polyamide fibers are used in the carcass ply, as mentioned in the above, stress concentration upon the end portions of the cords increases as compared with the steel cords. Thus, the tire is likely to break at an earlier stage. In order to prevent this, it is necessary that a radially outer end of a first reinforcing layer which protects the end portion of the carcass ply is arranged higher than the end of the turn-up portion of the carcass ply.

(2) At that time, even when a breakage nucleus is transferred from the end of the turn-up portion of the carcass ply to the end of the first reinforcing layer, no effect cannot be expected if stress concentration at the end of the first reinforcing layer is as large as in the case with stress concentration upon the carcass ply end. The diameter of and an interval between steel cords used in the first reinforcing layer needs to be selected so that the stress concentration upon the end of the first reinforcing layer may be lower than that at an end of a turn-up portion of a carcass ply in a tire of at least the same size in which steel cords are used in the carcass ply.

(3) Further, the height of a rim flange is low in a tire of a 15°-taper rim type. Therefore, in order to prevent pulling-out of the carcass ply due to tire internal pressure, the height of the turn-up portion of the carcass ply cannot be lowered so much. Accordingly, the radially outer end of the first reinforcing layer naturally approaches a zone (ordinarily called a flexible zone) where the side wall portion largely deflects during rotation under load. Because of this, it is necessary that a second reinforcing layer is further arranged axially outside the first reinforcing layer and that an radially outer end of the second reinforcing layer is located higher than the radially outer end of the first reinforcing layer. By so doing, cracking at the radially outer end portion of the first reinforcing layer can be prevented and durability of the bead portion can be improved equal to or more than that of a tire using steel cords in a carcass ply. On the other hand, since the radially outer end of the second reinforcing layer is positioned higher than the radially outer end of the first reinforcing layer, a reinforcing layer of organic fiber cords having a smaller cord diameter needs be used as the second reinforcing layer to prevent cracking at the end portion of second reinforcing layer itself.

To attain the above-mentioned object, as shown in FIG. 1, the heavy duty pneumatic radial tire according to the present invention comprises a carcass ply 1, a pair of bead cores 2 around which the carcass ply is turned up from the inside to the outside in a tire width direction, and first and second reinforcing layers 3 and 4 successively laminated on outer sides of turn-up portions of the carcass ply in the tire with direction. The carcass ply 1 contains aromatic polyamide fiber cords arranged at a cord angle of about 90° with respect to a tire equatorial plane. A height "$H_P$" of an end 1a of the turn-up portion of the carcass ply is set at from 0.075 to 0.16 times as high as a height "$H_T$" of the carcass ply in a tire section. The first reinforcing layer 3 is composed of steel cords which are arranged obliquely to the cords of the carcass ply. A radially outer end 3a of the first reinforcing layer 3 positioned outside the carcass ply in the tire width direction is located higher than the end 1a of the carcass ply. The following relation is present among $a_1$ mm, $d_1$ mm, $a_2$ mm and $d_2$ mm which are a cord radius of the steel cords of the first reinforcing layer and an interval between the steel cords in a direction orthogonal to the cords at the radially outer end thereof, and a cord radius of the cords of the carcass ply, and an interval between the carcass ply cords in the direction orthogonal to the cords, respectively.

$$\frac{d_1}{a_1} \tan\left(\frac{a_1}{d_1}\pi\right) \leq \frac{T_1}{T_2} \frac{d_2}{a_2} \tan\left(\frac{T_2}{T_1}\frac{a_2}{d_2}\pi\right) \quad (1)$$

In the formula, $T_1$ and $T_2$ are a tenacity (kg) of a single cord constituting the first reinforcing layer 3, and a tenacity (kg) of a single cord constituting the carcass ply 1, respectively.

The second reinforcing layer 4 consists of at least two reinforcing layer units 4-1 and 4-2 of organic fiber cords, the cords of the former intersecting with those of the latter. The second reinforcing layer 4 is continuously arranged from the axially outer side of the first reinforcing layer 3 to the axial inside of the carcass ply. An axially outer end 4-1a of the reinforcing layer unit 4-1 of the second reinforcing layer 4 is positioned higher by 5 to 20 mm than the axially outer end 3a of the first reinforcing layer 3. The radially outer end 4-1a of the reinforcing layer unit 4-1 is vertically spaced from a radially outer end 4-2a of the reinforcing layer unit 4-2 by 5 to 20 mm. The radially outer end 4-2a of the reinforcing layer unit 4-2 located on the axially outermost side is positioned at the highest level. The second reinforcing layer unit 4-1 is arranged adjacent to the first reinforcing layer 3 that so the cords of the former may intersect with those of the latter.

In practicing the present invention, it is preferable to arrange the cords in the second reinforcing layer 4 at a cord angle of 45°±20°, desirably, 45°±10° with respect to a tire radial direction.

These and other objects, features and advantages of the present invention will be appreciated upon reading of the following description of the invention when taken in conjunction with attached drawings, with the understanding that some modifications, variations and changes of the same could be made by the skilled person in the art to which the invention pertains without departing from the spirit of the invention or the scope of claims appended hereto.

BRIEF DESCRIPTION OF THE INVENTION

For a better understanding of the invention, reference is made to the attached drawings, wherein:

FIG. 2 is a schematic view showing a cord angle $\theta$ in a second reinforcing layer shown in FIG. 1;

FIG. 3 is a graph showing a relation between the cord angle $\theta$ and torsional rigidity; and FIGS. 4 and 5 are schematic views illustrating structures of reinforcing layers in Comparative Examples.

DETAILED DESCRIPTION OF THE INVENTION

Figure 1:
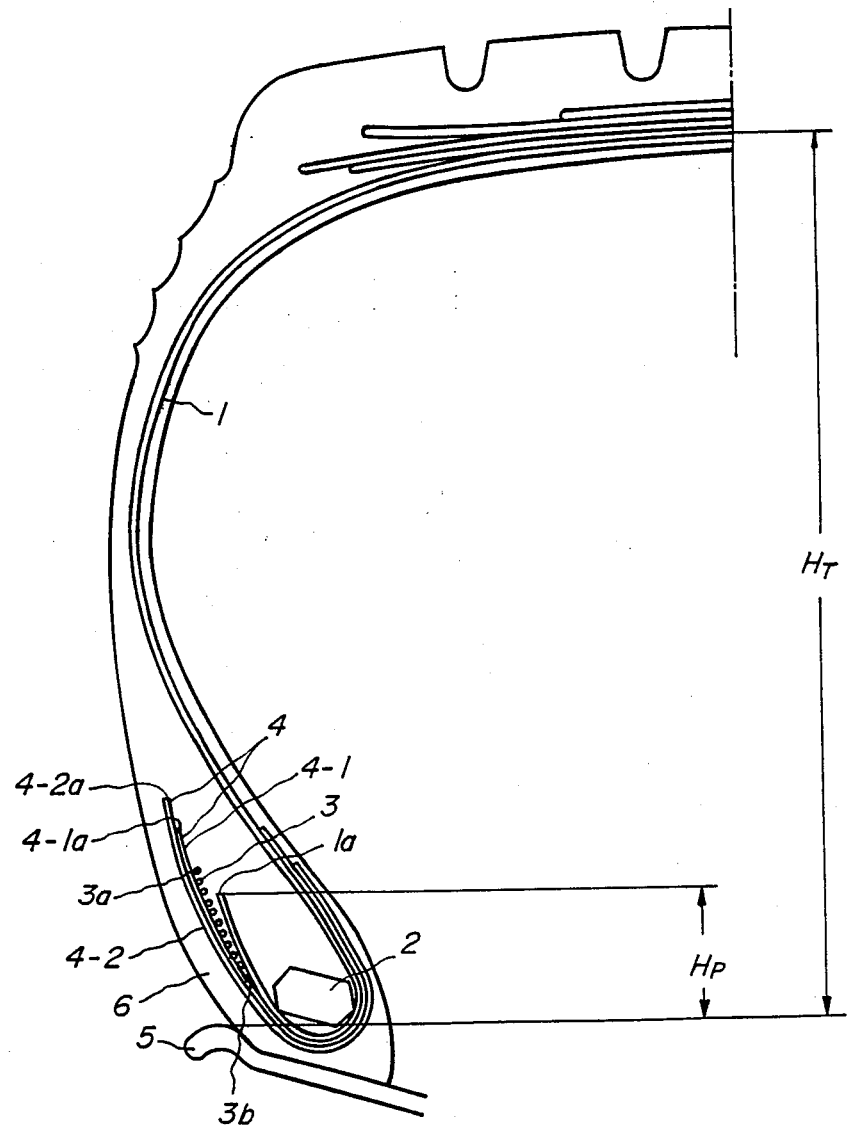
FIG. 1 is a partial cross sectional view of a tire according to the present invention.

The present invention will be explained in more detail with reference to the attached drawings.

First, reasons for the limitations of the present invention will be explained.

The reason why the height $H_P$ of the end 1a of the turn-up portion of the carcass ply 1 is set at from 0.075 to 0.16 time as high as the height $H_T$ of the carcass ply 1 in the tire section is as follows:

Particularly in tires of a 15°-taper rim type, a height of a rim flange 5 is low. Therefore, if the height $H_P$ is less than 0.075 times, the end portion of the carcass ply is likely to be pulled out due to tire internal pressure. On the other hand, if it is more than 0.16 times, the end approaches a zone where a deflection deforming during rotation under load is large, so that stress concentrates and the tire breaks from the ply end at an early stage to reduce effects aimed at by the present invention.

The reason why the first reinforcing layer 3 and the second reinforcing layer 4 are necessary is as follows:

As compared with the use of the steel cords in the carcass ply, the end portion of the carcass ply 1 is likely to break at an earlier stage. Thus, it is necessary that a breakage nucleus is moved to the radially outer end of the first reinforcing layer by protecting the end of the carcass ply with the high rigidity first reinforcing layer 3 composed of the steel cords. On the other hand, since the end 1a of the turn-up portion of the carcass 1 is higher than the rim flange 5, the end 3a of the first reinforcing layer 3 is naturally higher than the rim flange. Thus, there remains a problem in that breakage may begin from the end 3a of the first reinforcing layer 3. Accordingly, a great effect is obtained when breakage at the end portion of the first reinforcing layer is controlled by arranging the second reinforcing layer. At that time, since the end of the second reinforcing layer 4 is positioned on a radially outermost side of a side wall, the reinforcing layer composed of organic fiber cords having a smaller cord diameter which cords less suffer stress concentration upon the end is necessary.

The reason why the radially outer end 3a of the first reinforcing layer 3 is positioned higher than the end 1a of the turn-up portion of the carcass ply 1, for instance, in a range from 5 to 15 mm is as follows:

If the radially outer end 3a is positioned higher by less than 5 mm, no effect can be obtained while the breakage nucleus shifts to the carcass ply end. If it exceeds this range, the radially outer end of the first reinforcing layer 3 approaches the zone where the deflection deformation is large during rotation under load to reduce the intended effect.

The reasons why the cord diameter and the cord interval in the first reinforcing layer 3 are restricted according to the above equation (1) is as follows:

When compared with a tire of the same size using steel cords in a carcass ply, strength of a carcass ply needs to be maintained at the same level as in the use of the steel cords, because the tire is used in the state that air is charged at the same internal pressure to obtain the same load performance. Therefore, when aromatic polyamide fibers are used, it is necessary that the diameter of the cords is increased or the cord interval is narrowed (or both of these countermeasures are necessary).

On the other hand, it is well known that when cracks of 2a in length are present in an object at an interval "d" between crack center lines, a degree of stress concentration at an end of the crack is expressed by a stress propagation factor K in the following expression (For instance, see Makoto Ishida, "Elastical analysis of cracks and a coefficient of stress intensity factor", published by Baifukan, June, 1976.), $$K = \sigma \sqrt{d \tan\left(\frac{\pi a}{d}\right)}$$

wherein $\sigma$ is a stress at an infinite distance.

Since a surface-treated portion for improving adhesion between a coating rubber and the cords is ordinarily removed at a sectional end portion of the carcass ply by cutting, a fine degree of peeling occurs in an interface between the cords and the coating rubber at a relatively early stage when the tire is rotated under load. Thus, a similar state at the ply end appear in which the diameter of the cords is 2a and the cord interval is d in the above expression.

Accordingly, a stress concentration becomes greater in the end portions of the turn-up portions of the carcass ply using the aromatic polyamide fiber cords in which the cord diameter is increased and the cord interval is narrowed, as compared with the use of the steel cords.

For this reason, stress which concentrated upon the end of the turn-up portion of the carcass ply concentrates upon the radially outer end 3a of the first reinforcing layer 3 by positioning the radially outer end of the first reinforcing layer 3 using the steel cords higher by 5 to 15 mm than the end 1a of the turn-up portion of the carcass ply 1 and axially outside the turn-up portion of the carcass ply. Consequently, great separation which has formerly occurred at the ends of the carcass ply is prevented and the pulling-out of the ply due to the internal pressure can be prevented.

However, if the rigidity of the first reinforcing layer 3 is lowered to much, an effect of protecting the end of the turn-up portion of the carcass ply is not obtained. Therefore, it is preferable that the rigidity of the first reinforcing layer 3 is a half or more of that of the carcass ply 1.

However, if the rigidity of the first reinforcing layer 3 is made too large, separation occurs at the radially outer end 3a of the first reinforcing layer due to the stress concentration which moves from the end 1a of the turn-up portion of the carcass ply to the radially outer end 3a of the first reinforcing layer. Therefore, in order to ensure durability at the same level as in the tire of at least the same size using steel cords in the carcass ply, it is necessary to attain conditions under which the stress concentration at the end 3a of the first reinforcing layer may be smaller than that at the end of the turn-up portion of the carcass ply. This is done by using the steel cords and having the same carcass ply strength as that of the carcass ply using the aromatic polyamide fiber cords, that is, to control the radius "$a_1$" of the steel cords of the first reinforcing layer and the cord interval "$d_1$" in a direction orthogonal to the cords in a range shown in the equation.

$$\frac{d_1}{a_1} \tan\left(\frac{a_1}{d_1}\pi\right) \leq \frac{T_1}{T_2} \frac{d_2}{a_2} \tan\left(\frac{T_2}{T_1}\frac{a_2}{d_2}\pi\right) \quad (1)$$

In order to mitigate compression stress concentrating upon the radially outer end 3a of the first reinforcing layer 3, it is necessary that the radially outer end 3a of the first reinforcing layer easily moves in a radially inward direction. If the other end 3b of the first reinforcing layer 3 is turned up around the bead core 2 to the axial inside of the tire, circumferential rigidity of the first reinforcing layer 3 becomes too high. Consequently, the compression strain concentrates at the radially outer end 3a of the first reinforcing layer. In view of the above, the radially inner end of 3b of the first reinforcing layer 3 needs to be located axially and radially outside the bead core 2 rather than radially inside the bead core 2.

By so doing, when a compression force acts upon the radially outer end 3a of the first reinforcing layer 3, the steel cords of the first reinforcing layer 3 shift in the tire circumferential direction to enlarge an angle between the steel cords and the tire radial direction and mitigate the compression strain. Further, it is necessary that the steel cords are arranged obliquely to the tire radial direction to induce the above phenomenon.

The reason why the levels of the axially outer ends 4-1a and 4-2a of the respective second reinforcing layer units 4-1 and 4-2 are made different by 5 to 20 mm is as follows:

If the level difference is less than 5 mm, stress concentrates and no effect is obtained. On the other hand, if it is more than 20 mm, the uppermost portion of the reinforcing layer enters the area where the sidewall portion deforms, so that the breakage preferentially occurs from the second reinforcing layer 4 to reduce the intended effect.

Although the bead portion 6 undergoes various deformation such as radial deformation due to a deflection of the tire during rotation under load or a circumferential deformation due to twisting during cornering. However, since the carcass ply cords are orthogonal to the tire circumferential direction in the case of the carcass ply 1 of the radial structure, rigidity is low. Accordingly, the steel cords of the first reinforcing layer 3 are arranged obliquely to the cords of the carcass ply 1. Thus, when the bead portion 6 is deflected and deformed through compression in the radial direction during rotation under load, the angle of the steel cords of the first reinforcing layer 3 varies so that the end portion undergoes a great torsional deformation.

Therefore, it is desirable that torsional rigidity of the second reinforcing layer 4 is increased. However, as shown in FIGS. 2 and 3, the torsional rigidity takes a maximum value when a cord angle $\theta$ of the cord B with respect to the tire radial direction A is 45°. Thus, the cord angle in the second reinforcing layer 4 is set in a range of 45°±20°, desirably, 45°±10° with respect to the tire radial direction, because a sufficient effect of increasing the torsional rigidity can be obtained in this range.

In the following, an explanation will be made of examples of heavy duty pneumatic radial tires according to the present invention. These examples are merely given in illustration of the invention, but should never be interpreted to limit the scope of the invention.

In a heavy duty pneumatic radial tire of a type shown in FIG. 1 having a tire size of 295/75R22.5, a height $H_T$ of a carcass ply in a tire section was set at 185 mm. The carcass ply 1 was constituted by aromatic polyamide fiber (3,000 d/3) cords having a diameter of 1.1 mm and a tenacity of 160 kg per cord. An internal between the cords (a cord center interval in a direction orthogonal to the cords) at an end of a turn-up portion of the carcass ply was set at 1.8 mm, and a height $H_P$ of the end 1a of the turn-up portion was set at 24 mm.

Steel cords having a cord diameter of 0.91 mm and a tenacity of 125 kg per cord were used at ($1 \times 3 + 9 + 15 + 1$) as cords of a first reinforcing layer 3, and an interval between the cords (a cord center interval in a direction orthogonal to the cords) at the radially outer end was set at 1.92 mm.

Nylon (1,260 d/2) cords were used at an average cord end count of 40 cords/50 mm as cords of a second reinforcing layer 4.

A difference in height level between the end 1a of the turn-up portion of the carcass ply 1 and the radially outer end 3a of the first reinforcing layer 3 was set at 10 mm, and the height difference between the radially outer end 3a of the first reinforcing layer and the radially outer end 4-1a of the second reinforcing layer unit 4-1 was set at 15 mm. The height difference between the radially outer end 4-1a and the radially outer end 4-2a of the second reinforcing layer unit 4-2 was set at 10 mm.

In order to confirm the effects of the present invention, tires in Examples 1 and 2 and Comparative Examples 1 and 2 were subjected to a bead portion durability test in a drum tester at a tire internal pressure of 7 kg under a load of 5,000 kg (200% loading). Results are shown in the following Table under comparison.

TABLE

|  | Durability | Remarks |
| --- | --- | --- |
| Example 1 | 150 | separated from the first reinforcing layer end |
| Example 2 | 170 | separated from the first reinforcing layer end |
| Comparative Example 1 | 100 | separated from the carcass ply end |
| Comparative Example 2 | 95 | separated from the carcass ply end |

In Example 1 according to the present invention, a cord angle of the steel cords in the first reinforcing layer 3 was set at 60° upwardly to the right, and cord angles of organic fiber cords of the second reinforcing layer units 4-1 and 4-2 were set at 60° upwardly to the left on the first reinforcing layer-adjoining side and 60° upwardly to the right on the axially outer side, respectively. In Example 2 according to the present invention, a cord angle of the steel cords in the first reinforcing layer 3 was set at 60° upwardly to the right, and a cord angle of organic fiber cords in the second reinforcing layer unit 4-1 was 52° upwardly to the left on the first reinforcing layer-adjoining side, while that of the second reinforcing layer unit 4-2 was at 52° upwardly to the right on the axially outer side.

In the tire of Comparative Example 1, as shown in FIG. 4, a steel reinforcing layer 3 was turned up adjacent to carcass ply 1 at a bead portion 6, and its cord angle was set at 60° upwardly to the right. The organic fiber cord reinforcing layer unit 4-1 was turned up and its cord angle was set at 60° upwardly to the left on the steel reinforcing layer side. The organic fiber cord reinforcing layer unit 4-2 had a cord angle of 60° upwardly to the right on the axially outer side. In Comparative Example 2, as shown in FIG. 5, three organic fiber cord reinforcing layers 4-1, 4-2, and 4-3 were successively arranged around a turned portion of a carcass ply 1 at the bead portion at cord angles of 60° upwardly to the right, 60° upwardly to the left and 60° upwardly to the right, respectively.

In Comparative Examples, the same materials as in Examples were used for the carcass ply, the steel cord reinforcing layer, and organic fiber cord reinforcing layer. The cord angle of the reinforcing layers, that is, an angle between the cords and the tire radial direction is an angle therebetween as viewed from the tire side.

The durability shown in the above Table is shown by index taking a result in Comparative Example 1 as 100, based on a running distance by which the bead portion was cracked in the drum test.

As obvious from the above, according to the present invention, the ends of the carcass ply which are disadvantageous from the standpoint of the stress concentration are each protected with a first reinforcing layer made of steel cords to move a breakage nucleus to the end of the first reinforcing layer. In addition, the stress concentration upon the first reinforcing layer is effectively mitigated by appropriately selecting the steel cords used and the end count and using the second reinforcing layer containing the organic fiber cords. Thus, the present invention can afford the heavy duty pneumatic tire with a carcass ply made of light weight aromatic polyamide fiber cords having equivalent excellent bead durability comparable to the tires using steel cords as the carcass ply.

What is claimed is:

1. A heavy duty pneumatic radial tire comprising a carcass ply having aromatic polyamide fiber cords arranged at a cord angle of about 90° with respect to a tire equatorial plane, a pair of bead cores around which the carcass ply is wound from an inside to an outside in a tire width direction to form turn-up portions of the carcass ply, and first and second reinforcing layers successively laminated upon outsides in the tire width direction of the turn-up portions of the carcass ply, wherein a height of the turn-up portion of the carcass ply is from 0.075 to 0.16 times as high as the maximum height of the carcass ply in tire section; the first reinforcing layer is composed of steel cords which are obliquely arranged with respect to the cords of the carcass ply; a radially outer end of the first reinforcing layer positioned outside in the tires width direction is located higher than an end of the turn-up portion of the carcass ply; the following relation is present among $a_1$ mm, $d_1$ mm, $a_2$ mm, and $d_2$ mm which are a cord radius of the steel cords and a cord interval of the steel cords at the radially outer end portion of the first reinforcing layer, and a cord radius and a cord interval of the carcass cords in a direction orthogonal to the cords in the carcass ply, respectively:

$$\frac{d_1}{a_1} \tan\left(\frac{a_1}{d_1}\pi\right) \leq \frac{T_1}{T_2} \cdot \frac{d_2}{a_2} \tan\left(\frac{T_2}{T_1} \cdot \frac{a_2}{d_2}\pi\right)$$

in which $T_1$ and $T_2$ are a tenacity (kg) of a single cord constituting the first reinforcing layer and a tenacity (kg) of a single cord constituting the carcass ply; the second reinforcing layer consists of at least two reinforcing layer units composed of organic fiber cords, the fiber cords of one of said at least two reinforcing layer units intersecting with those of an adjacent reinforcing layer unit; said second reinforcing layer is continuously turned up from the axially outer side of the first reinforcing layer to the inside of the carcass ply; a height of a radially outer end of the second reinforcing layer is positioned higher by 5 to 20 mm than that of the radially outer end of the first reinforcing layer; radially outer ends of the reinforcing layer units of the second reinforcing layer are vertically spaced 5 to 20 mm from each other; a height level of the radially outer end of the second reinforcing layer unit on the axially outermost side is highest; and the cords of the second reinforcing layer unit adjoining to the first reinforcing layer intersect with those of the first reinforcing layer.

2. A heavy duty pneumatic radial tire according to claim 1, wherein the second reinforcing layer has a cord angle of 45°±20° to a tire radial direction.

3. A heavy duty pneumatic radial tire according to claim 2, wherein the second reinforcing layer has a cord angle of 45°±10° to a tire radial direction.

* * * * *